US009486835B2

(12) United States Patent
Kising

(10) Patent No.: US 9,486,835 B2
(45) Date of Patent: Nov. 8, 2016

(54) APPARATUS AND METHOD FOR ULTRASOUND SCREENING

(71) Applicant: ARTECH ULTRSONIC SYSTEMS AG, Bottighofen (CH)

(72) Inventor: Juergen Kising, Kreuzlingen (CH)

(73) Assignee: ARTECH ULTRASONIC SYSTEMS AG, Bottighofen (CH)

( * ) Notice: Subject to any disclaimer, the term of this patent is extended or adjusted under 35 U.S.C. 154(b) by 0 days.

(21) Appl. No.: 14/421,456

(22) PCT Filed: Apr. 18, 2013

(86) PCT No.: PCT/EP2013/058129
§ 371 (c)(1),
(2) Date: Feb. 13, 2015

(87) PCT Pub. No.: WO2014/040762
PCT Pub. Date: Mar. 20, 2014

(65) Prior Publication Data

US 2015/0239012 A1 Aug. 27, 2015

(30) Foreign Application Priority Data

Sep. 12, 2012 (DE) ........................ 10 2012 108 529

(51) Int. Cl.
*B07B 1/34* (2006.01)
*B07B 1/40* (2006.01)
*B07B 1/50* (2006.01)
(Continued)

(52) U.S. Cl.
CPC . *B07B 1/40* (2013.01); *B07B 1/42* (2013.01); *B07B 1/4609* (2013.01); *B07B 1/50* (2013.01); *B07B 2230/04* (2013.01)

(58) Field of Classification Search
CPC ........... B07B 1/28; B07B 1/34; B07B 1/343; B07B 1/36; B07B 1/40; B07B 1/42; B07B 2230/04; B01D 33/0346
See application file for complete search history.

(56) References Cited

U.S. PATENT DOCUMENTS 5,213,216 A * 5/1993 Suehiro .............. B01D 33/0346 209/236
5,386,169 A 1/1995 Dubruque
5,653,346 A * 8/1997 Frei .................... B01D 33/0346 209/254
5,799,799 A * 9/1998 Alamzad .................. B07B 1/42 209/365.1

(Continued)

FOREIGN PATENT DOCUMENTS

DE 18 07 711 5/1970
DE 44 18 175 12/1994

(Continued)

OTHER PUBLICATIONS

PCT/EP 2013/058129, International Search Report mailed Jul. 15, 2013, 3 pages—German, 5 pages—English.

(Continued)

*Primary Examiner* — Joseph C Rodriguez
(74) *Attorney, Agent, or Firm* — Andrew F. Young, Esq.; Lackenbach Siegel, LLP

(57) ABSTRACT

An apparatus for ultrasound screening with a screen frame a screen fabric arranged in the screen frame with at least one ultrasound converter for producing ultrasonic vibrations. Ultrasonic vibrations may be introduced into the screen fabric via sound-conducting connection with the ultrasound converter, and the location of the screen fabric at which the introduction of the ultrasonic vibrations into the screen fabric may be varied.

18 Claims, 5 Drawing Sheets

(51) Int. Cl.
*B07B 1/42* (2006.01)
*B07B 1/46* (2006.01)

(56) References Cited

U.S. PATENT DOCUMENTS

| | | | | |
|---|---|---|---|---|
| 6,079,569 | A * | 6/2000 | Monteith | B06B 3/00 209/346 |
| 6,845,868 | B1 | 1/2005 | Krush et al. | |
| 7,182,206 | B2 * | 2/2007 | Hukki | B07B 1/46 209/365.1 |
| 7,497,338 | B2 * | 3/2009 | Garrett | B07B 1/40 209/365.1 |
| 7,694,826 | B2 * | 4/2010 | Garrett | B07B 1/40 209/365.1 |
| 8,485,364 | B2 * | 7/2013 | Krush | B07B 1/54 209/326 |
| 8,564,226 | B2 * | 10/2013 | Kising | B65G 27/00 310/311 |
| 2005/0072717 | A1 * | 4/2005 | Purohit | B07B 1/36 209/309 |
| 2005/0082234 | A1 * | 4/2005 | Solenthaler | B01D 33/0376 210/748.05 |

FOREIGN PATENT DOCUMENTS

| | | |
|---|---|---|
| DE | 10 2006 047 592 | 4/2008 |
| EP | 2049 274 | 4/2009 |
| FR | 2 682 050 | 4/1993 |

OTHER PUBLICATIONS

PCT/EP2013/058129, Written Opinion mailed Jul. 15, 2013, 7 pages—German, 9 pages—English.

Ultrasound-assisted sifting, Transfer Nr. 33—1996, BNSDOCID:EXP_622145A_1, pp. 26-27, Reinhard Züst, 2 pages—German, 2 pages—English.

PCT/EP 2013/058129, International Search Report mailed Jul. 15, 2013, 3 pages—German, 3 pages—English.

Singapore Pat. Appln. Serial No. 11201501281X, Office Action dated Jan. 13, 2016, 7 pages—English.

* cited by examiner

APPARATUS AND METHOD FOR ULTRASOUND SCREENING

CROSS REFERENCE TO RELATED APPLICATIONS

This application relates to and claims priority from WIPO Ser. No. PCT/EP2013/058129 filed Apr. 18, 2013, the entire contents of which are incorporated herein by reference, which in turn claims priority to DE Ser. No. 10 2012 108 529.3 filed Sep. 12, 2012.

BACKGROUND OF THE INVENTION

1. Field of the Invention

The present invention relates to an apparatus for ultrasound screening.

2. Description of the Related Art

For a variety of processes, especially those involving the loading, use, or production of bulk materials, especially powders, it is customary to screen the bulk materials produced or used. In this context, it has been known for many years that ultrasound excitation of the screen fabric can substantially enhance the throughput rate. The throughput rate during ultrasound screening depends on the tendency of the screen fabric to become clogged. By the use of ultrasound, the fabric openings are kept free, since the static friction is transformed by the ultrasound movement into the weaker sliding friction and powder bridges are broken up.

According to the prior art, however, the use of ultrasound for ultrasound screening entails a number of conditions. In order to ensure a satisfactory channeling of the ultrasound vibrations into the screen fabric, metallic screen fabrics must be used, and moreover they must precisely fulfill certain fabric tension conditions. In practice, only screen fabrics with mesh below 300 μm can be used at present.

The suitable bulk materials also place limits on the use of known ultrasound screens or limit their efficiency. Moist or wet bulk materials result in heavy attenuation and thus loss of ultrasound action. With other bulk materials there can be an electrostatic build-up, which hinders the throughput rate.

For many years there has been a quest to find ways of introducing the ultrasound into the screen fabric in ever more efficient manner in order to boost the throughput rate which can be achieved with ultrasound screening. Thus, for example, it is known from U.S. Pat. No. 5,386,169 how to undertake an ultrasound excitation on the screen frame, which is then transmitted to the screen fabric stretched in the screen frame. But this method is only practicable for relatively small screens, because with increasing distance of a region of the screen fabric from the screen frame attenuation effects weaken the amplitude of the ultrasound vibration more and more.

Therefore, a switch has taken place, especially for large ultrasound screens, no longer to carry out the ultrasound excitation of the screen fabric through the screen frames, but instead through sound conductors or resonators, i.e., sound conductors tuned to a particular ultrasound frequency, which are arranged on the screen fabric, especially those glued in place. Such screening systems are known, for example, from FR 2 682 050 or DE 10 2006 047 592.

The most varied approaches have been chosen in the effort to ensure a sufficient sonic input on the entire screen fabric, e.g., a consistent exciting of the sound conductor into resonance (see, e.g., DE 44 18 175 A1) or frequency variation about a working point at which the entire system takes up high power from the generator driving the ultrasound converter (see, e.g., EP 2 049 274 B1).

However, it has been shown that these methods also continue to have drawbacks. On the one hand, there is the expense of attaching the sound conductors or resonators and problems in connecting the sound conductors to the screen frame, which is supposed to prevent an unwanted draining of ultrasound energy into the screen frame, and on the other hand the sound conductor must be mechanically supported, especially in the case of screen systems where the screening process is further sustained by an external movement, such as tumble screening.

Finally, there continue to be urgent problems in providing the necessary ultrasound intensity at all places of the screen fabric. These problems specifically manifest themselves in that sticking grains which occur cannot be removed by the ultrasound excitation at all places of the screen fabric. In the case of sound conductors firmly attached to the screen fabric, the energy density and the achieved amplitude of vibration is often not enough to remove sticking grains from the mesh openings.

The problem which the invention solves is to provide a method for ultrasound screening and an ultrasound screen which ensure an improved distribution of the ultrasound excitation over the screen fabric and thus accomplish an improved throughput rate of the screened material.

Accordingly, there is a need for an improved apparatus and method for ultrasound screening.

ASPECTS AND SUMMARY OF THE INVENTION

According to one alternative aspect of the present invention, this problem is solved by a device for ultrasound screening with the features of disclosed herein and a method for ultrasound screening with the features disclosed herein.

The device for ultrasound screening according to the invention has a screen frame with a screen fabric arranged in the screen frame. Generally the screen fabric is also stretched by the screen frame and/or supported by it. Advisedly, the screen fabric is arranged in the screen frame so that the material being screened can only pass through the clear opening of the screen frame after passing through the screen fabric.

Moreover, the device for ultrasound screening according to the invention has at least one ultrasound converter for excitation of ultrasound vibrations and at least one means of introducing ultrasonic vibrations into the screen fabric, which is in sound-conducting connection with the ultrasound converter. Many such means of introducing ultrasonic vibrations into the screen fabric are known in the prior art, especially plates, wedges, rods and sonotrodes.

It should be noted in this place that the ultrasound converters, whose function consists in the transformation of electrical signals into ultrasound vibrations, are generally actuated and driven with an ultrasound generator, which generate the corresponding electrical signals. However, ultrasound generators are generally sold separately and are suitable for actuating and driving the ultrasound converters of the most diverse devices, so that they are not necessarily seen as being a part of the device for ultrasound screening, even though they are essential for its operation. For the invention being specified here, the type and the control principle of the generator is irrelevant, whether it be fixed frequency, variation over a given frequency range, or phase locking; it operates with any given generator and any given control principle.

It is essential to the invention that at least one of the means of introducing ultrasonic vibrations into the screen fabric is arranged movably relative to the screen fabric so that the place of the screen fabric at which the introducing of the ultrasound vibrations into the screen fabric by the means of introducing ultrasonic vibrations into the screen fabric occurs can be varied by movement of the means of introducing ultrasonic vibrations into the screen fabric relative to the screen fabric. In other words, a degree of freedom of movement is provided for at least one of the means of introducing ultrasonic vibrations into the screen fabric, making possible a shifting of the place at which the introducing of ultrasound vibrations into the screen fabric occurs.

Thus, according to the invention, the secure and uniform distribution of the ultrasound vibrations over the screen fabric is assured in that the place at which the ultrasound is introduced into the screen fabric can be varied by a movable arrangement of the means of introducing ultrasonic vibrations into the screen fabric. Instead of trying to influence in a manner the propagation of the ultrasound vibrations in the screen fabric by configuring the means of introducing ultrasonic vibrations into the screen fabric and the manner in which excitation is done, one assures by a movement of the means of introducing ultrasonic vibrations into the screen fabric, i.e., by changing the place at which ultrasound vibrations are put into the screen fabric, that the necessary ultrasound intensity can be provided at all places of the screen fabric.

This paradigm shift brings with it a number of major advantages. In the first place, it is no longer necessary for a propagation of the ultrasound vibrations to occur in the screen fabric. Thus, the former requirements placed on the screen fabric go away. Secondly, the form of the means of introducing ultrasonic vibrations into the screen fabric is no longer oriented to the requirements for uniform distribution of the ultrasound vibrations over the screen fabric. This enables, in particular, smaller contact surfaces with the screen fabric, which brings with it a higher power density. Moreover, in one advantageous embodiment of the invention, means for amplitude modification can be provided in this way at the means of introducing ultrasonic vibrations into the screen fabric.

Basically, one can provide the means of introducing ultrasonic vibrations into the screen fabric above the screen fabric or below the screen fabric. Above the screen fabric means upstream from the screen fabric looking in the direction opposite the flow of bulk material, that is, in the unscreened flow of bulk material. Below the screen fabric means, accordingly, downstream from the screen fabric in the flow of bulk material, that is, in the screened flow of bulk material. The latter arrangement will be preferred.

These definitions of “above” and “below” can be applied directly to the interpretation of terms such as “on top”, “beneath”, “top side” or “bottom side” in the sense of this patent.

In one advantageous modification of the invention which is distinguished by particular efficiency, at least one of the means of introducing ultrasonic vibrations into the screen fabric is arranged on or beneath the screen fabric so that it exerts pressure on the screen fabric at least when the ultrasound screen is arranged in the desired powder flow. It is especially advantageous when the pressure is so large that a deformation of the screen fabric stretched in the screen frame occurs.

It should be noted that an arrangement in which a means of introducing ultrasonic vibrations into the screen fabric exerts pressure on the screen fabric is present in particular when means of introducing ultrasonic vibrations into the screen fabric are mounted or secured, independently of the screen fabric, so that the means and the screen fabric can move relative to each other, especially also at their contact surfaces.

The positive effect which is accomplished in that one or more means of introducing ultrasonic vibrations into the screen fabric are arranged above or on the screen fabric so that the latter is under pressure is so great that this modification in combination with the features of the preamble of claim 1 counts as an independent invention, representing an alternative solution to the aforementioned problems.

There are a number of different possibilities of achieving a pressure exerted on the screen fabric by a means of introducing ultrasonic vibrations into the screen fabric. For example, it is possible for a screen fabric stretched on the screen frame to be placed under pressure in that means of introducing ultrasound into the screen fabric are arranged so that they pass through the plane defined by the contact areas between screen frame and screen fabric in which the screen fabric is stretched, i.e., they rise above this plane in both directions. Depending in particular on the mesh and the material thickness and the material properties of the screen fabric, this protruding can have the effect that bulges are evident at the contact sites between the means of introducing ultrasonic vibrations into the screen fabric and the screen fabric at the end facing away from the means of introducing ultrasonic vibrations into the screen fabric, basically reflecting in particular the structure of the means of introducing ultrasonic vibrations into the screen fabric.

But this is not absolutely necessary, because especially when the means of introducing ultrasonic vibrations into the screen fabric have been placed in their position, after the screen fabric is stretched on the screen frame, a protruding by only a few tenths of a mm is already sufficient.

The pressure can be strengthened by the powder flow when using the ultrasound screen or optionally be created only at that time. In the traditional ultrasound screening thus far, where no independent mounting or attachment of the means of introducing ultrasonic vibrations into the screen fabric and the screen fabric was ensured, especially in the case of means of introducing ultrasonic vibrations into the screen fabric that are glued to the screen fabric, a strong powder flow on the screen fabric only means that the screen fabric is deformed together with the means of introducing ultrasonic vibrations into the screen fabric that are arranged on it. On the contrary, when means of introducing ultrasonic vibrations into the screen fabric are mounted or attached independently of the screen fabric, so that means of introducing ultrasonic vibrations into the screen fabric and screen fabric can move relative to each other, preferably also at their contact surfaces, there is only a deformation of the screen fabric, which builds up a pressure between screen fabric on the means of introducing ultrasonic vibrations into the screen fabric, which remain stationary. Merely for the sake of complete explanation, it is mentioned that the pressure of the material flow on the screen fabric naturally according to Newton’s principle of action and reaction produces a counterpressure between the means of introducing ultrasonic vibrations into the screen fabric and the screen fabric at the places where the deformation of the screen fabric is hindered by the means of introducing ultrasonic vibrations into the screen fabric.

It is especially efficient in this independent invention to use a star-shaped or lattice structure of platelike sound conductors as the means of introducing ultrasonic vibrations into the screen fabric.

The overarching principle which is common to both inventions is that each time a device is provided for ultrasound screening with a screen frame with a screen fabric arranged in the screen frame with at least one ultrasound converter for generating of ultrasound vibrations, and with at least one means of introducing ultrasonic vibrations into the screen fabric, wherein the means of introducing ultrasonic vibrations into the screen fabric is in sound-conducting connection with the ultrasound converter, wherein means are provided for introducing a force into at least one of the means of introducing ultrasonic vibrations into the screen fabric, so that a movement or a pressure is produced or can be produced.

The following described preferred embodiments can apply each time to both inventions.

In one preferred embodiment of the invention, the means of introducing ultrasonic vibrations into the screen fabric is movable so that each place of the screen fabric can be brought into contact with one segment—that is, any one but not necessarily the same one or even every segment—of the means of introducing ultrasonic vibrations into the screen fabric. This ensures a complete exposure of the entire screen fabric to ultrasound.

In one preferred modification of the invention, the screen fabric is nonmetallic, in particular, made of plastic. This enables the use of more economical systems and can be of advantage especially when screening aggressive, such as corrosive substances.

Furthermore, the use of large-mesh screens, especially screens with a mesh size of over 300 μm, becomes possible. The mesh size indicates the greatest distance between two edges of the mesh.

In one preferred embodiment of the invention, the device for ultrasound screening also has a driving device for the movement of at least one movable means of introducing ultrasonic vibrations into the screen fabric relative to the screen fabric. This can be, in particular, a motor, which moves the movable means of introducing ultrasonic vibrations into the screen fabric. Especially in the case of tumbling screening machines, vibration screening machines and similar devices in which the screen itself is moved to support the screening process, the drive can also be implemented in purely mechanical fashion by utilizing changes in the potential energy resulting from position changes of the screen to produce the movement.

In one preferred modification of the invention, the screen frame has a support structure on the side of the screen fabric on which the movable means of introducing ultrasonic vibrations into the screen fabric are arranged, on which the movable means of introducing ultrasonic vibrations into the screen fabric is movably mounted and/or at which a driving device is arranged for movement of the movable means of introducing ultrasonic vibrations into the screen fabric. This enables a very simple design of the invention. Basically, the mechanism which enables the movement of the movable means of introducing ultrasonic vibrations into the screen fabric and/or any other drive unit which is present can also be mounted or arranged on the screen frame or on a separate holder on the screening machine.

In another advantageous embodiment of the invention, the movable means of introducing ultrasonic vibrations into the screen fabric can rotate relative to the screen fabric. This degree of freedom is especially advantageous for circular screen frames, because when one designs the means of introducing ultrasonic vibrations into the screen fabric able to rotation about an axis which runs perpendicular to the screen fabric through the midpoint of the circular screen frame and additionally adapts its extent to the radius or diameter of the circular screen frame, one can in very simple manner make sure that ultrasound can be introduced directly into every region of the screen fabric. A driving directly by the rotor of a motor is then possible.

In another modification of the invention, the movable means of introducing ultrasonic vibrations into the screen fabric is arranged relative to the screen fabric so that the movable means of introducing ultrasonic vibrations into the screen fabric or an axis about which it can rotate stands at an angle between 90° and 0° to the screen fabric. This can be further optimized in that the angle can be varied between the screen fabric and the movable means of introducing ultrasonic vibrations into the screen fabric or the axis about which it can rotate. These measures are especially advisable when the contact surface of the movable means of introducing ultrasonic vibrations into the screen fabric is configured as a curved surface, because then the local energy density which is applied can be varied.

Alternatively or additionally to a rotational degree of freedom, the movable means of introducing ultrasonic vibrations into the screen fabric can be designed to move in linear displacement relative to the screen fabric. This degree of freedom is especially important for rectangular screen frames. If one configures the means of introducing ultrasonic vibrations into the screen fabric to be able to move in linear manner in a direction running parallel to two opposite sides of a rectangular screen frame over the entire length of these sides and additionally adapts its dimension to the distance between these opposite sides of the screen frame, one can in very simple mariner make sure that ultrasound can be introduced directly into each region of the screen fabric. A drive is then possible by a simple motorized linear drive.

In the method according to the invention for ultrasound screening, a device with a screen frame, with a screen fabric arranged in the screen frame, with at least one ultrasound converter for generating ultrasound vibrations, and with at least one means of introducing ultrasonic vibrations into the screen fabric, wherein the means of introducing ultrasonic vibrations into the screen fabric is in sound-conducting connection with the ultrasound converter, is arranged at least for a portion of the time in a flow of the material being screened in a screening process and the screen fabric is excited with ultrasound vibrations at least for a portion of the time in the course of the method by the means of introducing ultrasonic vibrations into the screen fabric.

According to the invention, the position of the means of introducing ultrasonic vibrations into the screen fabric is varied relative to the screen fabric during the method.

Thus, instead of trying to configure the means of introducing ultrasonic vibrations into the screen fabric and the manner in which it is excited in order to influence the propagation of the ultrasound vibrations in the screen fabric in a desired manner, one ensures that the necessary ultrasound intensity can be provided at all places of the screen fabric by a movement of the means of introducing ultrasonic vibrations into the screen fabric, that is, by a changing of the location in which the ultrasound vibrations are fed into the screen fabric. It is explicitly pointed out that a soiled ultrasound screen can also be cleaned with the same method.

The method is especially efficient if pressure is exerted on the screen fabric by at least one or more means of introducing ultrasonic vibrations into the screen fabric from above or from below. In particular, it is advantageous for the pressure to be so large that it produces a deformation of the screen fabric stretched in the screen frame.

The positive effect which is achieved in that pressure is exerted on the screen fabric by one or more means of introducing ultrasonic vibrations into the screen fabric from above or from below is so great that this feature in combination with the features of the preamble of claim 13 counts as an independent invention, representing an alternative solution to the above stated problems. It is especially efficient in this independent invention to use a star-shaped or lattice structure of platelike sound conductors as the means of introducing ultrasonic vibrations into the screen fabric The overarching principle which is common to both inventions is that each time a method is provided for ultrasound screening, wherein a device with a screen frame (11, 21, 31, 41), with a screen fabric arranged in the screen frame, with at least one ultrasound converter for generating of ultrasound vibrations, and with at least one means of introducing ultrasonic vibrations into the screen fabric, wherein the means of introducing ultrasonic vibrations into the screen fabric is in sound-conducting connection with the ultrasound converter, is arranged at least for a portion of the time in a flow of the material being screened in a screening process and the screen fabric is excited with ultrasound vibrations at least for a portion of the time in the course of the method by the means of introducing ultrasonic vibrations into the screen fabric, while a force acts on at least one of the means of introducing ultrasonic vibrations into the screen fabric, producing a movement or a pressure on the screen fabric.

The following described preferred embodiments can apply each time to both methods.

In one preferred embodiment of the method, at least one or more means of introducing ultrasonic vibrations into the screen fabric from above or from below is brought into contact with the screen fabric and the means of introducing ultrasonic vibrations into the screen fabric is brought into contact with one or more ultrasound converters directly or indirectly through sound feed conductors.

The method can be designed to be particularly efficient if, in addition to the movement of the means of introducing ultrasonic vibrations into the screen fabric, the frequency of the ultrasound excitation is varied by running through one or more frequency ranges, especially the frequency range or ranges in which resonances of the device are situated, or in which maximum power uptake of the device occurs. For example, this can be organized so that the selected frequency range is swept through once on the screen fabric in a given position of the means of introducing ultrasonic vibrations into the screen fabric and then the position is changed by movement of the means of introducing ultrasonic vibrations into the screen fabric to the next desired position. But a continual frequency variation can also be provided during a continual movement of the means of introducing ultrasonic vibrations into the screen fabric.

In one preferred modification of the method, the frequency of the ultrasonic excitation lies in the Megahertz range, i.e., in the range between 1 and 10 MHz.

Especially advantageous is a method in which the angle between the screen fabric and the movable means of introducing ultrasonic vibrations into the screen fabric is varied in addition.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
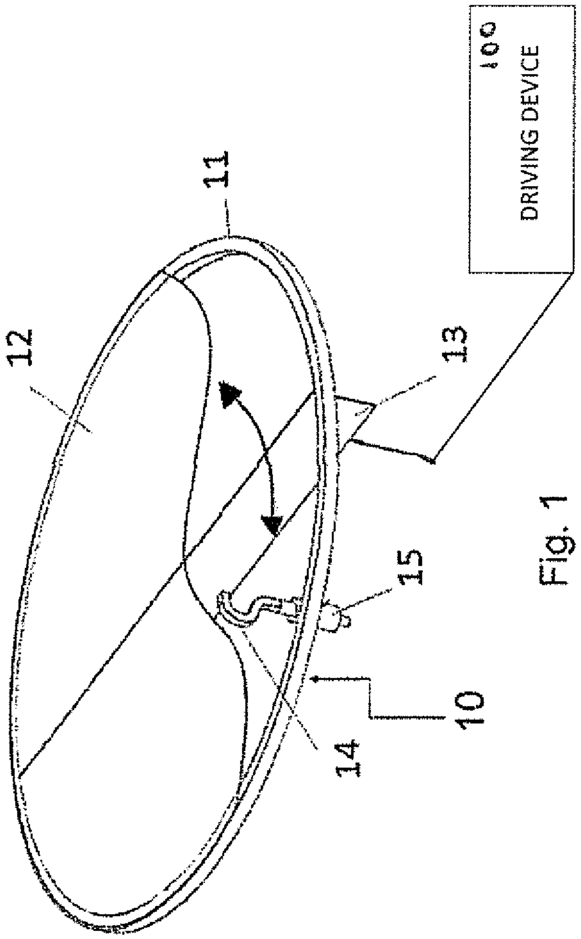
FIG. 1: a first sample embodiment of a device for ultrasound screening, seen at a slant from above.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

FIG. 1 shows a device for ultrasound screening 10 with a circular screen frame 11, in which a screen fabric 12 is arranged. Whereas in reality the screen fabric 12 extends across the entire surface enclosed by the circular screen frame 11, it is only partly shown in FIG. 1, in order to make possible a more distinct representation of the components of the device for ultrasound screening 10 situated beneath the screen fabric 12. For the same reason, the surfaces of completely covering screen fabric 22, 32 and 42 actually enclosed by the respective screen frames 21, 31, and 41 are only partly shown in FIGS. 2, 3 and 4.

Specifically, the screen fabric 12 can be glued, for example, to a circular screen frame 11. For the excitation of the screen fabric 12, a movable means 13 of introducing ultrasonic vibrations into the screen fabric 12 is provided in the form of a platelike resonator lying against the screen fabric 12, whose length corresponds to the diameter of the circular screen frame 11. The platelike resonator lies with its narrow side on the screen fabric along a line of contact, corresponding to a diameter of the circular screen frame 11. The ultrasonic vibrations introduced by the platelike resonator into the screen fabric are generated by an ultrasound converter 15 and transmitted to the platelike resonator via a sound feed conductor 14, configured here as a sylphon.

It is especially important that, as indicated by the double arrow D in FIG. 1, the means of introducing ultrasonic vibrations in the form of a platelike resonator lying against the screen fabric 12 can turn, via a driving device 100, about an axis running through the midpoint of the circular screen frame perpendicular to the screen fabric 12. During this rotation, during which the sound feed conductor 14 and the ultrasound converter 15 are also carried along, being preferably joined firmly to each other and to the platelike resonator so that they form a common rigid subassembly, the place changes on the screen fabric 12 at which the ultrasound vibrations are introduced into the screen fabric 12. Thus, the movable means 13 of introducing ultrasonic vibrations into the screen fabric 12 is movably arranged relative to the screen fabric so that the place of the screen fabric at which the introducing of the ultrasound vibrations into the screen fabric by the movable means 13 of introducing ultrasonic vibrations into the screen fabric can be changed by movement of the movable means 13 of introducing ultrasonic vibrations into the screen fabric 12 relative to the screen fabric 12. In particular, the chosen geometry of the movable means 13 of introducing ultrasonic vibrations into the screen fabric ensures that ultrasound can be introduced into the screen fabric 12 by the rotary movement at each point of the surface of the screen fabric 12, which is especially advantageous for a reliable avoidance or removal of sticking grains.

FIG. 1 does not show the means actually present for holding the subassembly composed of ultrasound converter 15, sound feed conductor 14 and platelike resonator 13 and a drive unit with which this rotary movement can be produced, since there are many possible implementations. The nature of the rotary movement performed can likewise be varied. For example, in the embodiment of FIG. 1, either a continual rotation in one direction can be provided, or it is also possible to perform a 180° rotation in one direction, followed by a 180° rotation in the other direction.

One possibility of mounting and drive unit is, for example, to arrange the ultrasound converter 15 on the surface of a turntable which can be placed in rotation by a motor, turning about an axis running through the midpoint of the circular screen frame 11 perpendicular to the screen fabric 12, centered at the point of the surface where it intersects the axis of rotation. It should be noted that such a turntable must be mounted so that it follows any movement of the screen frame 11, such as that in tumbling or vibrating screening machines, i.e., it remains stationary relative to the screen frame 11.

Another possibility might be to support the platelike resonator in a bearing (not shown) which is vibration coupled and able to rotate, running along the inner circumference of the screen frame 11, and to provide a motor (not shown), which produces the rotary movement of the platelike resonator by interacting with the screen frame 11, for example, by engaging of a motor rack (not shown) with a toothed rail (not shown) arranged at the inner circumference of the screen frame 11.

Figure 2:
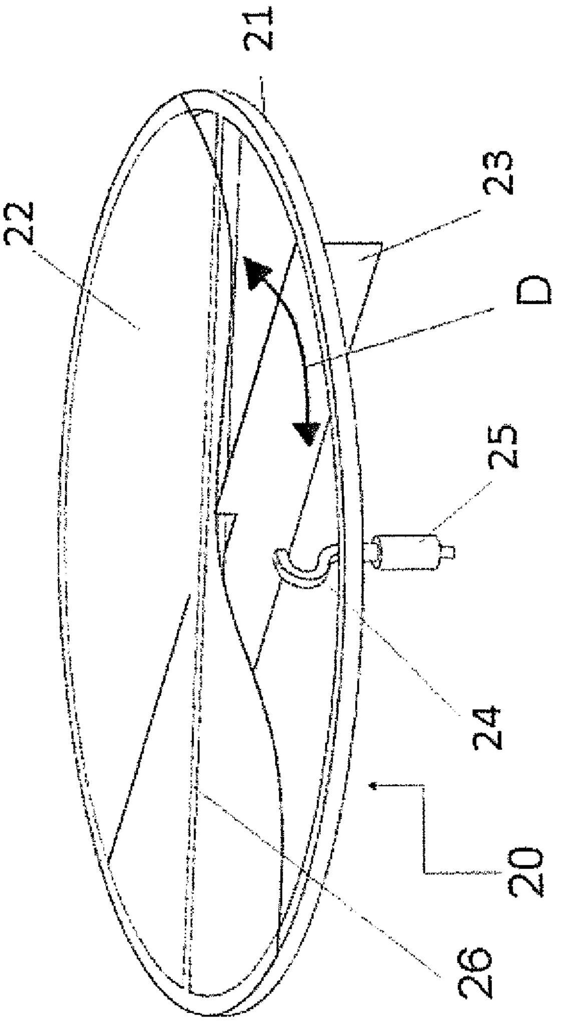
FIG. 2: a second sample embodiment of a device for ultrasound screening, seen at a slant from above.

FIG. 2 shows a second embodiment of a device for ultrasound screening 20 with screen frame 21, screen fabric 22, movable means 23 of introducing ultrasonic vibrations into the screen fabric 22 in the form of a platelike resonator placed against the screen fabric 22, which can turn about an axis running through the midpoint of the circular screen frame perpendicular to the screen fabric 22, sound feed conductor 24 and ultrasound converter 25. The device for ultrasound screening 20 differs from the device for ultrasound screening 10 of FIG. 1 in that a girder 26 is arranged underneath the screen fabric 22, which runs along a diameter of the screen frame 21. This girder 26 enables in particular an especially simple way of providing propulsion and mounting of the movable means 23 of introducing ultrasonic vibrations into the screen fabric, but it generally limits the possible angle of rotation to just 180°, so that this angle of rotation has to be swept alternately forward and backward.

For example, for the mounting and propulsion a motor (not shown) can be mounted on the girder 26 at the axis of rotation, on whose rotor the platelike resonator 23 is placed with sound feed conductor 24 fastened to it, and ultrasound converter 25 secured to the latter.

Figure 3:
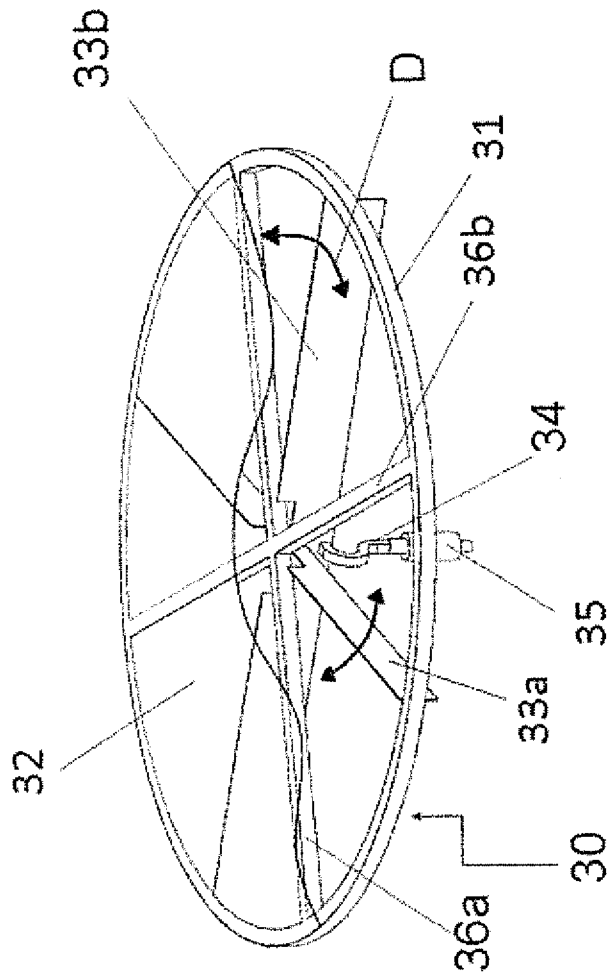
FIG. 3: a third sample embodiment of a device for ultrasound screening, seen at a slant from above.

FIG. 3 shows a third embodiment of a device for ultrasound screening 30 with screen frame 31, screen fabric 32, two movable means **33*a*, 33*b* of introducing ultrasonic vibrations in the form of platelike resonators placed against the screen fabric 32, which can turn about an axis running through the midpoint of the circular screen frame perpendicular to the screen fabric 32, sound feed conductor 34 and ultrasound converter 35, as well as two girders 36*a*, 36*b*. The device for ultrasound screening 30 differs from the device for ultrasound screening 20 of FIG. 2 in the number of girders 36*a*, 36*b* and the number of movable means 33*a*, 33*b* of introducing ultrasonic vibrations. Thanks to the larger number of girders 36*a*, 36*b*, the mechanical stability of the device for ultrasound screening 30 can be boosted. But since these girders limit the possible angle range of rotation of the movable means 33*a*, 33*b* of introducing ultrasonic vibrations into the screen fabric 33, the number of movable means 33*a*, 33*b* must be increased if one still wants to make sure that ultrasound can be introduced at least at practically every place of the screen fabric 32**.

Figure 4:
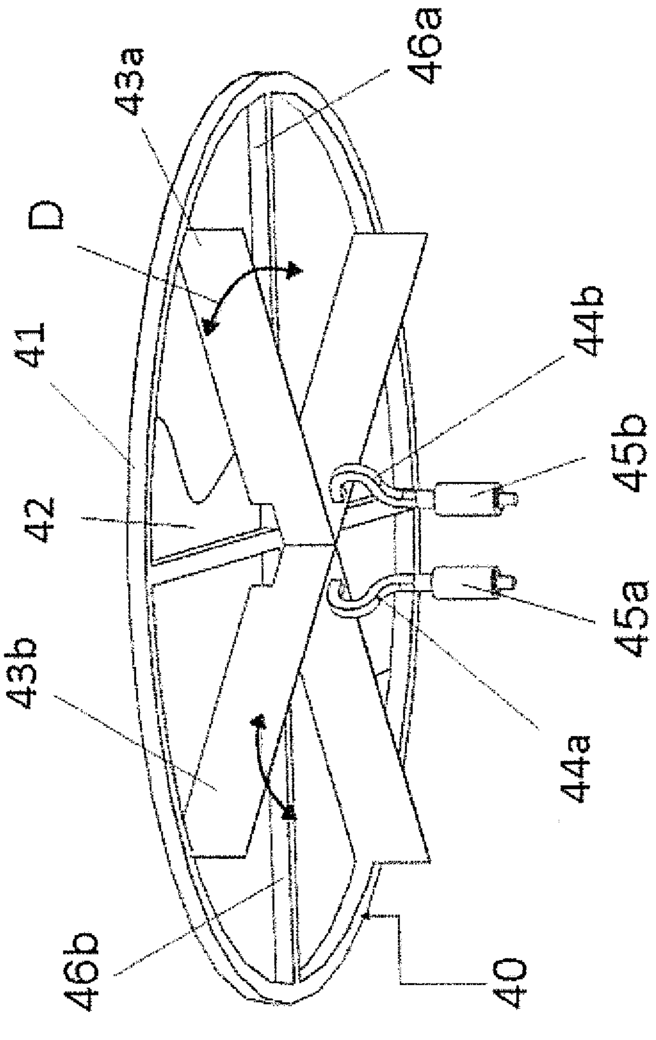
FIG. 4: a fourth sample embodiment of a device for ultrasound screening, seen at a slant from below.

FIG. 4 shows a fourth embodiment of a device for ultrasound screening 40 with screen frame 41, screen fabric 42, and two movable means **43*a*, 43*b* of introducing ultrasonic vibrations in the form of platelike resonators placed against the screen fabric 42, which can turn about an axis running through the midpoint of the circular screen frame perpendicular to the screen fabric 42 at least in a particular angle range, and girders 46*a*, 46*b*. The device for ultrasound screening 40 differs from the device for ultrasound screening 30 of FIG. 3 in that a separate ultrasound converter 45*a*, 45*b* is assigned to each of the platelike resonators across a separate sound feed conductor 44*a*, 44*b*. This makes it possible to provide different ultrasound excitations on the screen fabric 42**.

Figure 5:
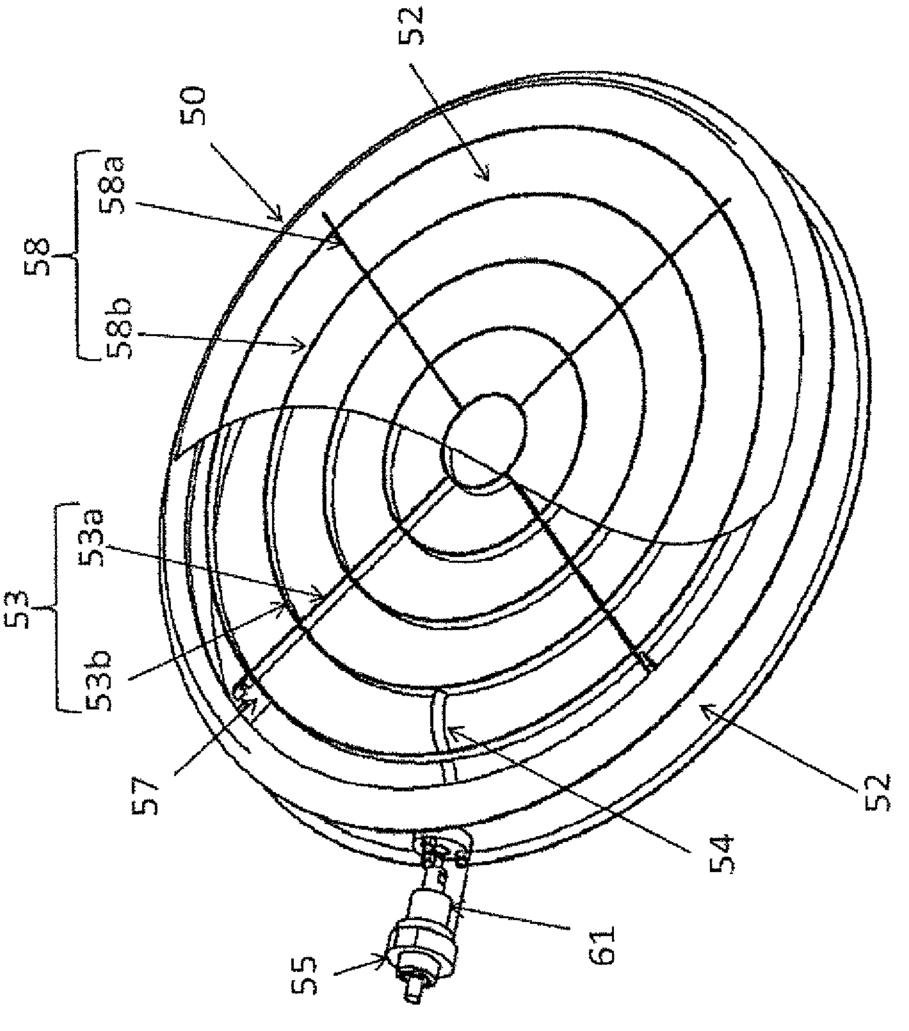
FIG. 5: a sample embodiment of a device for ultrasound screening, in which the means of introducing ultrasonic vibrations into the screen fabric are arranged on the screen fabric so that pressure is exerted on the screen fabric.

FIG. 5 shows a sample embodiment of a device for ultrasound screening 50 with a converter holder 61 arranged on an outer wall of the screen frame and with an ultrasound converter 55 mounted in the converter holder 61, which across a sound feed conductor 54 led through the screen frame 51 in sound-conducting manner to the means 53 of introducing ultrasonic vibrations into a screen fabric 52.

In the embodiment of FIG. 5, the means 53 of introducing ultrasonic vibrations into the screen fabric 52, only partly shown, have the form of an ultrasound lattice composed of several circular rings **53*a*, which are arranged on a cross-shaped girder 53*b*, which are arranged underneath the screen fabric 52**. But of course other shapes, especially square and rectangular lattices and structural modifications or combinations thereof can be realized.

The cross-shaped girder **53*b* is mounted on the frame at each end of the cross with fastening angles 57 in a way so that the means 53 of introducing ultrasonic vibrations into the screen fabric 52 exerts a pressure on the screen fabric 52 at least when the device for ultrasound screening 50** is arranged in the powder flow of the material being screened, in the preferred embodiment shown, but also outside of such a powder flow.

In order to illustrate this, FIG. 5 shows bulges 58, i.e., contours forced through the screen fabric 52 by the means 53 of introducing ultrasound into the screen fabric 52, in the form of lines in the segment in which the screen fabric 52 is depicted. These follow the shape of the means 53 of introducing ultrasonic vibrations into the screen fabric 52, arranged underneath and not directly visible in this segment. But it should be noted that the question of whether or not an arrangement of means 53 of introducing ultrasonic vibrations into the screen fabric 52 in such a way that pressure is exerted on the screen fabric 52 will result in bulges 58 on the side of the screen fabric 52 opposite the means 53 of introducing ultrasonic vibrations into the screen fabric 52 leads from properties of the screen fabric 52 used. Especially with relatively stiff screen fabrics 52, even a considerable pressure might not produce any bulges 58. Furthermore, a bulging 58 of the screen fabric 52 also can only be seen in the powder flow.

In particular, bulges 58*a* which follow the shape of the circular rings 53*a* and bulges 58*b* which follow the shape of the cross-shaped girder 53*b* can be recognized.

A preferred possibility of achieving an arrangement of the means 53 of introducing ultrasound into the screen fabric 52 is to arrange the means 53 using the fastening angles 57 so that they rise above the plane of the screen frame 51 in which the screen fabric 52 is secured, i.e., they stick out in the direction opposite the direction of the powder flow when in operation. A protrusion by only a few tenths of a millimeter is already enough for many applications.

It can be advantageous for the fastening angles 57 to have means (not shown) for adapting the position of the means 53 of introducing ultrasound into the screen fabric 52 relative to the plane of the screen frame 51 in which the screen fabric 52 is secured. This can be done, for example, by providing oblong holes or a threading in or at the fastening angles 57, engaging with corresponding fastening means of the means 53 of introducing ultrasound into the screen fabric 52.

In order to avoid a flowing of ultrasound energy via the fastening angles 57 into the screen frame 51, an ultrasound dampening material can be used optionally between the fastening angles 57 and the fastening means of the means 53 of introducing ultrasound into the screen fabric 52, such as discs or rectangular plates of silicone, rubber, or comparable materials, not shown in FIG. 5.

Alternatively or additionally, it is also possible to configure the connection by using mechanical decoupling elements arranged between the fastening angles 57 and the means 53 of introducing ultrasound into the screen fabric 52 or their fastening means, constituting a filter for the excited frequencies. Such decoupling elements are familiar in the prior art.

LIST OF REFERENCE NUMBERS

10, 20, 30, 40, 50 device for ultrasound screening
11, 21, 31, 41, 51, screen frame
12, 22, 32, 42, 52 screen fabric
13, 23, 33*a*, 33*b*, 43*a*, 43*b*, 53 means of introducing ultrasonic vibrations
53*a* girder
53*b* circular ring
14, 24, 34, 44*a*, 44*b*,54 sound feed conductors
15, 25, 35, 45*a*, 45*b*, 55 ultrasound converter
26, 36*a*, 36*b*, 46*a*, 46*b* girder
57 fastening angle
58, 58*a*, 58*b* bulge
61 converter holder Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A device for ultrasound screening, comprising:
a screen frame with a screen fabric arranged in the screen frame;
at least one ultrasound converter providing excitation of ultrasound vibrations;
at least one means of operably introducing ultrasonic vibrations into the screen fabric, the means of introducing ultrasonic vibrations into the screen fabric is in a sound-conducting connection with the ultrasound converter,
at least one of the means of introducing ultrasonic vibrations into the screen fabric being arranged operably movably in continuous direct contact relative to the screen fabric so that the place of the screen fabric at which the introducing of the ultrasound vibrations into the screen fabric by the means of introducing ultrasonic vibrations into the screen fabric occurs is operatively varied by continuous contacting movement of the means of introducing ultrasonic vibrations into the screen fabric relative to the screen fabric during operation,
the means of introducing ultrasonic vibrations further comprising at least one movable means, the device for ultrasound screening further comprising:
a driving device for the movement of the at least one movable means of introducing ultrasonic vibrations into the screen fabric relative to the screen fabric, the movement including rotational movement relative to and in said continuous direct contact with the screen fabric and being movable to bring the means of introducing ultrasonic vibrations in contact with at least a portion of the screen fabric.

2. The device for ultrasound screening, according to claim 1, wherein:
at least one of the means of introducing ultrasonic vibrations into the screen fabric is arranged at least one of on and underneath the screen fabric so that it exerts pressure on the screen fabric.

3. The device for ultrasound screening, according to claim 1, wherein:
the means of introducing ultrasonic vibrations into the screen fabric are at least one of mounted and attached independently of the screen fabric so that the means and the screen fabric can move relative to each other.

4. The device for ultrasound screening, according to claim 1, wherein:
the means of introducing ultrasonic vibrations into the screen fabric is movable so that every place of the screen fabric can be brought into contact with a segment of the means of introducing ultrasonic vibrations into the screen fabric.

5. The device for ultrasound screening, according to claim 1, wherein:
the screen fabric consists of a nonmetallic material selected from a group of nonmetallic materials including a plastic.

6. The device for ultrasound screening according to claim 1, wherein:
the screen fabric has a mesh of more than 300 μm.

7. The device for ultrasound screening, according to claim 1, wherein:

the screen frame further comprises:

at least one girder on the side of the screen fabric on which the means of introducing ultrasonic vibrations into the screen fabric are arranged, on which the means of introducing ultrasonic vibrations into the screen fabric is movably mounted and at which a driving device is arranged for movement of the means of introducing ultrasonic vibrations into the screen fabric.

8. The device for ultrasound screening, according to claim 1, wherein:

the means of introducing ultrasonic vibrations into the screen fabric is operative to rotate relative to the screen fabric.

9. The device for ultrasound screening, according to claim 1 wherein:

the means of introducing ultrasonic vibrations into the screen fabric is arranged such relative to the screen fabric that the means of introducing ultrasonic vibrations into the screen fabric or an axis about which it can rotate makes an angle of 90° to 0° the screen fabric.

10. The device for ultrasound screening, according to claim 9, wherein:

the angle between the screen fabric and the means of introducing ultrasonic vibrations into the screen fabric or the axis about which it can rotate can operatively vary during a use.

11. The device for ultrasound screening, according to claim 1, wherein:

the means of introducing ultrasonic vibrations into the screen fabric can operatively move in linear displacement relative to the screen fabric.

12. The device for ultrasound screening, according to claim 1, wherein:

the contact surface of the means of introducing ultrasonic vibrations into the screen fabric is a curved surface.

13. A method for ultrasound screening, comprising the steps of:

providing a screen frame with a screen fabric arranged in the screen frame with at least one ultrasound converter for generating ultrasound vibrations, and with at least one means of introducing ultrasonic vibrations into the screen fabric, the means of introducing ultrasonic vibrations into the screen fabric being in a direct sound-conducting connection with the ultrasound converter, and being arranged at least for a portion of the time in a flow path of the material being screened in a screening process and the screen fabric and during a use is excited with ultrasound vibrations at least for a portion of the time in the course of the method by the means of introducing ultrasonic vibrations into the screen fabric; and varying a position of the means of introducing ultrasonic vibrations into the screen fabric relative to the screen fabric, including rotating the means of introducing ultrasonic vibrations in direct contact to the screen fabric during a use thereof so that different places of the screen fabric are excited into ultrasound vibrations and are brought into contact with at least a portion of the means of introducing ultrasonic vibrations.

14. A method, according to claim 13, further comprising the step of:

exerting a pressure on the screen fabric by at least one or more means of introducing ultrasonic vibrations into the screen fabric from at least one of from above and from below.

15. The method, according to claim 13, further comprising the steps of:

bringing into contact at least one or more means of introducing ultrasonic vibrations into the screen fabric from at least one of from above and from below with the screen fabric: and bringing into contact the means of introducing ultrasonic vibrations into the screen fabric with at least one of the ultrasound converters at least one of directly and indirectly through sound feed conductors.

16. The method, according to claim 13, further comprising the step of varying the frequency of the ultrasound excitation by running through one or more frequency ranges in which resonances of the device are situated and in which maximum power uptake of the device occurs.

17. The method, according to claim 16, wherein:

the frequency of the ultrasound excitation lies in the Megahertz range.

18. The method, according to claim 13, further comprising the steps of:

varying an angle between the screen fabric and the means of introducing ultrasonic vibrations into the screen fabric.

* * * * *